United States Patent
Alvarez

(10) Patent No.: US 6,898,243 B1
(45) Date of Patent: May 24, 2005

(54) APPARATUS AND METHODS FOR DOWN-CONVERSION VIDEO DE-INTERLACING

(75) Inventor: José Roberto Alvarez, Sunnyvale, CA (US)

(73) Assignee: Conexant Systems, Inc., Newport Beach, CA (US)

(*) Notice: Subject to any disclaimer, the term of this patent is extended or adjusted under 35 U.S.C. 154(b) by 560 days.

(21) Appl. No.: 09/439,920

(22) Filed: Nov. 12, 1999

(51) Int. Cl.[7] .......................... H04N 7/12; H04N 11/04; H04N 11/02
(52) U.S. Cl. .......................... 375/240.14; 375/240.13; 375/240.24
(58) Field of Search .................. 375/240.14, 240.12, 375/240.13, 240.24; 348/448, 441

(56) References Cited

U.S. PATENT DOCUMENTS 6,262,773 B1 * 7/2001 Westerman .................. 348/448
6,324,216 B1 * 11/2001 Igarashi et al. ........ 375/240.14

* cited by examiner

*Primary Examiner*—Chris Kelley
*Assistant Examiner*—Charles Parsons
(74) *Attorney, Agent, or Firm*—Thomas, Kayden, Horstemeyer & Risley

(57) ABSTRACT

A video converter provides for converting an interlaced video datastream to a de-interlaced form suitable for progressive-input coding. Conversion is conducted in accordance with determined motion of image portions within the video datastream. In a preferred MPEG-1 and MPEG-2 IC pre-processor implementation, during motion processing, intra-frame and inter-frame motion analyses are conducted for a current-pixel. The resulting motion determinations are further correlated with derived and/or coding metrics and combined; the combination is also limited, smoothed and a transfer function is applied to produce a mix control. During further video processing, current-pixel data from a current field ("field data") and corresponding filtered current frame data ("filtered frame data") are mixed in accordance with the mix control. Resulting output preferably comprises filtered frame data for low or no determined motion, field data for high motion and motion-related mixtures of the two for remaining motion determinations.

5 Claims, 10 Drawing Sheets

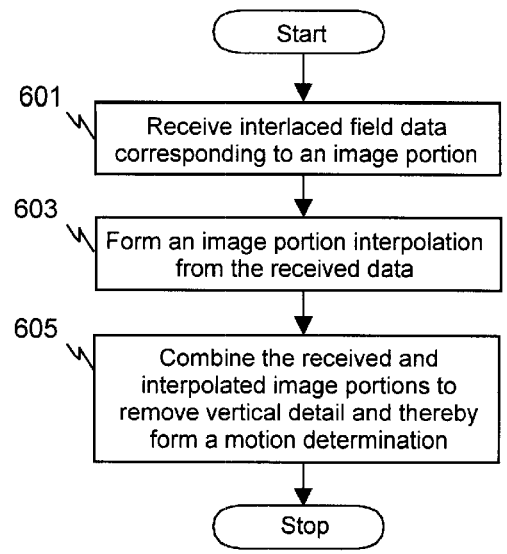
FIG. 6a
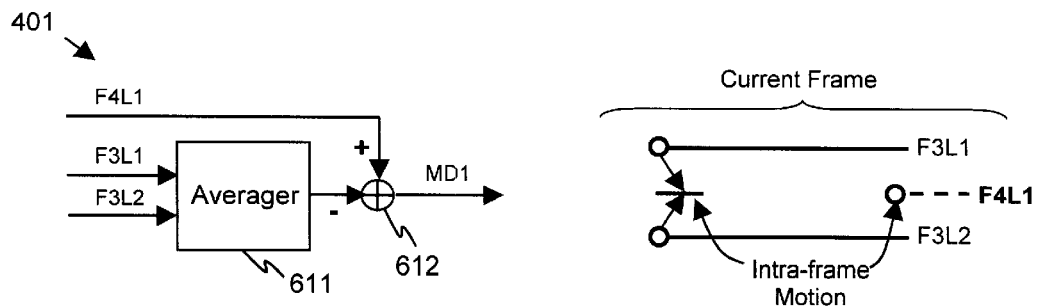
FIG. 6b   FIG. 6c

APPARATUS AND METHODS FOR DOWN-CONVERSION VIDEO DE-INTERLACING

BACKGROUND OF THE INVENTION

1. Field of the Invention

The present invention relates generally to digital video processing and, more particularly, to digital video encoding.

2. Discussion of Prior Art

Significant advances continue to be made in video processing technology. Analog video (e.g. NTSC, PAL, etc.), which provided only limited compression through typically single scan-line or one-dimensional ("1-D") processing, has been surpassed by more efficient multiple scan-line or two-dimensional ("2-D") digital video. 2-D video has in turn been surpassed by horizontal, vertical and temporal or three-dimensional ("3-D") digital video. Even MPEG-1, which was once the predominant mainstream 3-D video codec standard, has also recently been surpassed by the more versatile and higher bitrate capable MPEG-2. Now MPEG-2 is today's predominant mainstream compression standard; however, work is already underway to develop still more-efficient techniques for providing even higher-compression ratios, and yet substantially perceivable-artifact free or "transparent" video coding (e.g. MPEG-4).

Despite ongoing advancements, however, remnants of earlier video coding nevertheless remain. For example, the broad processing stages of the FIG. 1 encoder-decoder pair or "codec" are still typically utilized. As shown, encoder 101 includes a pre-processor 111 for refining the source video bitstream to facilitate coding, an encode-subsystem 113 for performing coding, and an optional multiplexer 115 for combining multiple data streams (not shown). Complimentarily, a typically matched decoder 103 includes an optional de-multiplexer 131, a decode-subsystem 133 for reconstructing video frames, and a post-processor for removing coding artifacts and performing final processing (e.g. display format conversion).

Another remnant of earlier video coding is the continued use of interlacing. Initially, interlacing (i.e. using alternate scan line sequences in overlaying fields) and other data-layering techniques were introduced to supplement the limited compression capability of analog video and thereby reduce bandwidth requirements. Interlacing also enabled an image to be captured as half-resolution fields (using less-expensive half-scan capturing devices) that could later be combined for display, and was quickly integrated as a basic format within most video devices (e.g. commercial television cameras, televisions, etc.). While the advent of 3-D (i.e. spatio-temporal) video and full-resolution capturing has obviated a specific technical need, cost concerns have instead resulted in the proliferation of interlacing with newer and emerging video devices and application standards (e.g. consumer cameras, VCRs, DVD, HDVD, HDTV, etc.).

The use of an interlaced video format is, however, problematic. One reason is that MPEG-1 and other early compression standards enable only frame-based continuous-scan or "progressive" input, which is not directly compatible with interlaced sources. MPEG-1, for example, expects a progressive source-input-format ("SIF") of 352×240 pixels per frame at 30 frames per second or 352×288 pixels per frame at 25 frames per second and does not recognize the subdivision of frames into fields. Contrastingly, interlaced sources supply two-fields per frame with afield resolution of 720× 240 pixels and afield rate of 60 fields per second (or equivalently, 720×480 pixels per frame at 30 frames per second). FIG. 2a further illustrates how a progressive frame 201 represents an instantaneous snapshot of a scene, while an interlaced frame 202 includes fields that are offset both vertically (i.e. by alternating scan lines) and temporally (e.g. by a 1/60 of a second delay between fields). Such offsetting is problematic with respect to not only conversion, but also other processing. (Note that fields 202a and 202b have been spaced apart for greater clarity; in actuality, the two field images will overlap in time.)

One conventional approach to resolving the incompatibility between an interlaced video source and progressive-only encoder input has been down-conversion de-interlacing. Two such techniques have traditionally been used. In the first technique decimation—one field of each video frame is summarily dropped from each frame during pre-processing and the remaining field is transferred to the encode-subsystem. In the second technique—averaging—during pre-processing, each interlaced video field pair is summarily combined, then the vertical frame resolution is filtered to avoid resultant aliasing, and then the pre-processed data is transferred to the encode-subsystem.

Unfortunately, both traditional down-conversion de-interlacing techniques, while known to produce generally low-quality results, are nevertheless in widespread use. Conventional decimation tends to produce a reduced quality step-wise appearance or "aliasing," which is not only generally perceivable, but also becomes even more noticeable at lower display resolutions (e.g. using MPEG-1). While averaging avoids a vertical aliasing problem of decimation, it nevertheless tends to cause blurring and other temporal artifacts.

The second conventional approach to resolving interlace-to-progressive or otherwise de-interlaced input incompatibilities has been to simply replace progressive-only codec standards (e.g. MPEG-1 and its progeny) with those capable of receiving both progressive and interlaced input (e.g. MPEG-2 and its progeny). However, despite the above-noted broad acceptance of such standards, there remains a significant number of legacy devices still in use that incorporate progressive-only encoding. In addition, MPEG-1 and other low-bitrate codec standards are proving useful in traditionally nonmainstream imaging applications, such as video conferencing (e.g. H.26n), among others.

Also unfortunate is that the more well-known up-conversion de-interlacing techniques used to convert interlaced output data for higher resolution progressive display purposes are inapplicable to down-conversion de-interlacing. By way of comparison, up-conversion of an NTSC video signal (FIG. 2b) requires field-to-frame conversion of from 240 lines at 1/60 of a second per field to 480 progressive frame lines at 1/60 of a second. In contrast, the current source video to encoder input incompatibility (FIG. 2c) requires frame-to-frame conversion of from 480 lines per frame at 1/60 of a second to 240 progressive frame lines at 1/30 of a second.

Accordingly, there remains a need for apparatus and methods capable of down-converting interlaced video signals into a high-quality, lower resolution signal capable of being coded by a progressive-only video encoder.

SUMMARY OF THE INVENTION

The present invention provides for converting interlace video signals into a down-conversion de-interlaced form suitable for use as higher-quality input for progressive-input video encoding. The invention further provides apparatus and methods that enable such higher-quality results to be achieved using minimal resources, thereby rendering higher-quality conversion more practical in low-resource as well as moderate-resource and resource-rich systems.

In accordance with the invention, it is found that higher-quality conversion runs contrary to summarily performing global field manipulations, as is conventionally practiced.

Rather, it is found that performing conversion adaptively in accordance with image-portion motion (e.g. pixels, pixel-groupings, objects, etc.) can produce higher-quality output. While further quality improvements are also achievable in accordance with the teachings herein, present quality improvements are achieved with minimal added complexity, computation and/or storage requirements.

Accordingly, in one aspect, the invention provides for establishing dynamic image-portion based motion criteria in accordance with which received interlaced data is manipulated for output. The invention also enables conversion to be conducted in accordance with intra-frame and inter-frame motion of image portions, and further, in accordance with experimentally derived results and/or coding metrics. In yet another aspect, the invention provides low-computation/ storage apparatus and methods for determining intra-frame and inter-frame motion, and for correlating and adapting such determinations for use in conducting processing of image portions. The invention further provides for adaptively combining image-portion data in accordance with motion. Among other aspects, the invention also provides for smoothing the transitional character of the conversion, and thereby avoiding perceivable artifacts in resulting de-interlaced output.

In a preferred embodiment, interlaced-to-progressive down-conversion is provided that is capable of being conducted by a preprocessor of an MPEG-1-&-MPEG-2 encoder IC. Operationally, a motion determination is formed for a current received interlaced video data portion, more preferably a pixel, which motion determination indicates amounts of corresponding frame and field data to include in de-interlaced output. More preferably, motion determinations are formed on an intra-frame and inter-frame basis by comparing a current pixel to a corresponding current-frame pixel interpolation and a corresponding prior-frame pixel respectively. The determinations are further modified according to experimentally-derived metrics, combined, smoothed and a transfer function is applied to form a control signal. Using the control signal, the current pixel and vertically filtered frame data corresponding to the current pixel are further combined in amounts corresponding to the determined motion to produce spatio-temporally down-converted de-interlaced output.

Advantageously, the present invention provides for adaptive conversion that avoids the aliasing, blurring and other artifacts produced by conventional converters. The invention also provides for higher-quality conversion using low-computation and storage apparatus and methods applicable to lower-resource devices (e.g. ICs, smaller portable devices) as well as more resource-rich devices in which limited resource allocation is also desirable (e.g. larger portable devices, personal computers, networks, settop boxes and other devices). The invention is also scalable, enabling more sophisticated and/or accelerated motion analysis and/or other processing to be conducted in accordance with applicable pre-encoder processing, encoding and/or other system requirements.

These and other objects and advantages of the present invention will become apparent to those skilled in the art after considering the following detailed specification together with the accompanying drawings.

BRIEF DESCRIPTION OF THE DRAWINGS

FIG. 6a is a flowchart illustrating an intra-frame motion determination method according to the invention;

FIG. 6b is a flow diagram illustrating an intra-frame motion analyzer according to the invention;

FIG. 6c illustrates pixel-based intra-frame motion determination as accomplished by the intra-frame motion analyzer of FIG. 6b;

DETAILED DESCRIPTION OF THE PREFERRED EMBODIMENT

In providing for converting an interlaced video datastream to a down-conversion de-interlaced form suitable for progressive-input coding, the present invention departs from conventional direct summary video manipulation. Instead, conversion is conducted adaptively in accordance with determined motion characteristics of received image portions.

For clarity, conversion is discussed in accordance with a preferred integrated circuit ("IC") encoder implementation. In such implementation, a converter according to the invention is provided as a pre-processor stage or sub-stage of an encoder that is capable of MPEG-1 and MPEG-2 support. The converter is enabled (e.g. via datastream recognition/enable-control) for providing higher-quality MPEG-1 encoding.

Those skilled in the art will appreciate, however, in view of the teachings herein that the invention is also applicable in a separated or integrated manner to various other implementations and/or systems. For example, the invention is applicable to other than MPEG-1 and/or MPEG-2, and includes video conferencing codecs (e.g. H.261 and H.263), and/or de-interlacing in accordance with other coding that receives data from an interlaced video source, but requires de-interlaced/progressive input. Various aspects can further be used in more resource-rich real-time and not real-time systems where it is nevertheless desirable to minimize resource utilization (e.g. PCs, networks/the internet, settop boxes, etc.); motion determination, correlation, image processing and/or other aspects of the invention are also adaptable for use with more extensive motion detection and/or image data processing, for example, in accordance with these and other systems. Aspects of the invention are further adaptable to implementation alternatives more generally utilized in processing systems such as PCs (e.g. hardware-software interchangeability, programmability, internal and/or external code/data originations and/or destinations, remote access, process acceleration, etc.), among yet other examples, only a few of which might be specifically noted herein.

Figure 3A:
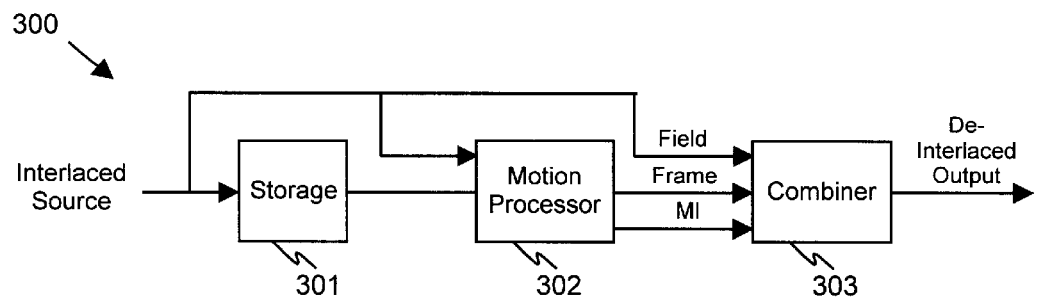
FIG. 3a is a flow diagram illustrating a converter according to the invention.

Beginning with the FIG. 3a flow diagram, converter 300 comprises coupled elements including storage 301, motion processor 301 and combiner 302, each of which receives image data from an interlaced data source (e.g. capture/storage device, transmission, etc.). Storage 301 provides for temporary storage of image data used in further processing. Motion processor 302 processes image data comprising a current portion of the received interlaced data to produce a motion indicator and frame data corresponding to the current image-portion. Combiner 303 merges data that preferably includes current-field data (from the interlaced source) and current-frame data (from motion-processor 302) in accordance with the motion indicator to produce de-interlaced output. (Those skilled in the art will appreciate that a frame/field motion history can also be maintained and utilized in the production of the motion indicator.)

Figure 3B:
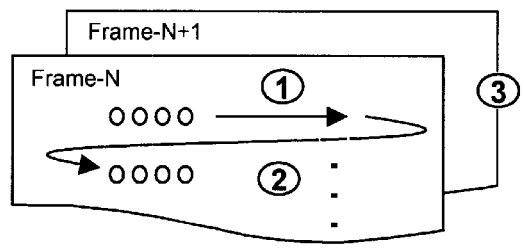
FIG. 3b illustrates an order in which pixel-based conversion is accomplished by the converter of FIG. 2.

Turning to FIG. 3b, contrary to the high overhead conventionally associated with fine data granularities, it is found that even greater-efficiency conversion of interlaced data is achievable in accordance with a frame-based, pixel-level granularity. That is, when conversion is enabled, the preferred encoder IC represents data corresponding to a pixel (i.e. two corresponding pixels in a two-field interlaced frame) by a corresponding de-interlaced output pixel.

More specifically, upon receipt of a current-frame, a field is selected as a current-field. A pixel of the current field ("current-pixel") is then utilized as a basis for conversion to produce de-interlaced data comprising amounts of pixel data from the current-pixel and the corresponding pixel of the corresponding scan line of the remaining field. Each remaining pixel of a current scan line is then converted in succession. Thereafter, each successive scan line of the current-field of the current-frame is converted in the same manner, followed by successive scan lines of further received frames.

Image-portions other than pixels can, however, also be utilized either alone or in conjunction with pixel utilization. The use of pixels as a basis for conversion is found to provide high quality results upon viewing, yet significantly reduces computation/storage requirements in accordance with further motion determination and other processing. Nevertheless, given sufficient resources in accordance with real-time or not real-time (e.g. significantly delayed, offline) application constraints, the use of objects is also expected to yield high quality results (e.g. via edge detection, object tracing, optical flow analysis and/or other methods). Pixel groupings can also be utilized, for example, to assure consistent processing in an image area, with respect to a particular image attribute and/or to achieve an overall perceptual effect (e.g. improved edges, lines, image-regions, etc.). Additional data can also be utilized, including data preceding and even following the current image-portion (e.g. in optimizing optical flow), among other examples. Those skilled in the art will also appreciate that altering the conversion sequence might be desirable, for example, in accordance with various image-portion utilizations, processing/storage resource availability and/or other constraints of a particular application.

Figure 3C:
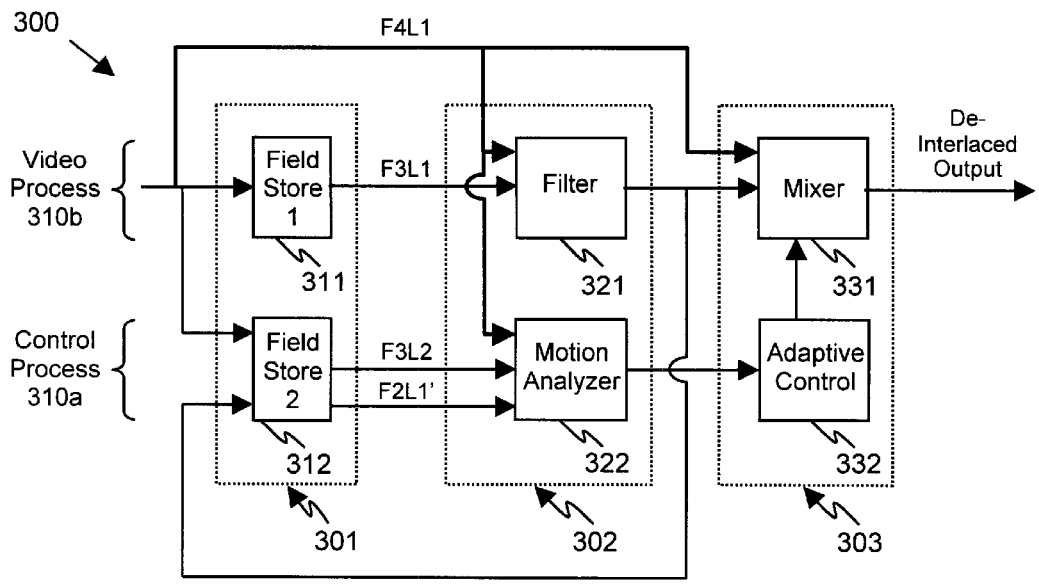
FIG. 3c is a flow diagram illustrating the converter of FIG. 3a in greater detail.

FIG. 3c illustrates in greater detail how the elements of converter 300 are configured for control processing 310a and video processing 310b in accordance with low-resource motion-adaptive conversion. For clarity, signals corresponding to a current image-portion (i.e. pixel) are highlighted using thicker arrows. The signal labels also correspond with a time-based single instance of conversion. That is, since converter 300 preferably utilizes only current-frame data and immediately prior-frame data for a current conversion, the two prior-frame fields are labeled respectively as F1 and F2, and the current-frame fields are labeled as F3 and F4. Further, utilized scan-lines in each field are labeled respectively as L1 and L2 (e.g. as in FIG. 7c). For example, in a conversion instance (and with respect to a current-pixel and corresponding-pixel pair), F2L1 indicates the then prior-frame, second field and first line; F3L2 indicates the then current-frame, first field and second line, and so on. As shown, each converter element further includes coupled elements as follows: storage 301 includes field store-I 311 and field store-2 312, motion processor 302 includes vertical filter 321 and motion analyzer 322, and combiner 303 includes mixer 331 and adaptive control 332.

Field stores 1 and 2 (311 and 312) assure timing of the receipt of image-portion data by processing elements. Current-frame pixel data from one scan line of the second field (F4L1) and two adjacent lines of the first field (F3L1 and F3L2) are preferably utilized. As an interlaced bitstream is received for a current-frame, field store-1 stores F3L1, field store-2 stores F3L2 and, in conjunction with receipt of F4L1 by processing elements, stored data is released to such processing elements in a conventional manner. In addition, "prior frame, second field and second line data" or F2L2 is also stored for use in the current conversion. F2L2 can be used without processing or prior conversion output can be used recursively; however, higher-quality results are observed using F2L2 data that has been vertically filtered prior to its use in motion determination. (In practice, F2L2 is also filtered prior to storage in accordance with its receipt.)

Thereafter, during control processing, motion analyzer 321 determines motion characteristics and forms a motion indicator for a current-pixel in F4L1 using corresponding pixel data from F3L1 and F3L2. Adaptive control 332 further uses the motion indicator to form a mix control parameter (discussed below). During video processing, filter 321 vertically filters the current-pixel (i.e. contained in F4L1) and corresponding pixel-data from F3L1, producing filtered frame data. Finally, mixer 331 receives and combines the current-pixel "field data" and the filtered frame data in amounts corresponding with the mix control parameter.

The configuration and operation of FIG. 3c provide considerable efficiency and adaptability. For example, the storage configuration facilitates efficient processing, particularly where real-time pixel-based control and video processing are conducted. Preferably, only two storage elements (e.g. conventional line buffers) are utilized; frame store-1 311 need only store data from F4L1, and frame store-2 312 stores only data from either F2L2 or F3L2, since F2L2 data is transferred from frame store-2 312 prior to storing F3L2. However, the storage configuration is also scalable for use with other image-portions, processing and/or larger data samplings (e.g. from additional fields, frames, lines, pixels, etc.). Control and video processing, while optimized for limited-resource operation, are similarly adaptable to more extensive control and/or video processing. More extensive motion determination can, for example, be readily integrated and further adapted for use with various field data integration techniques (which has instead been reduced to a more simple and efficient mix operation), among other examples.

Figure 1:
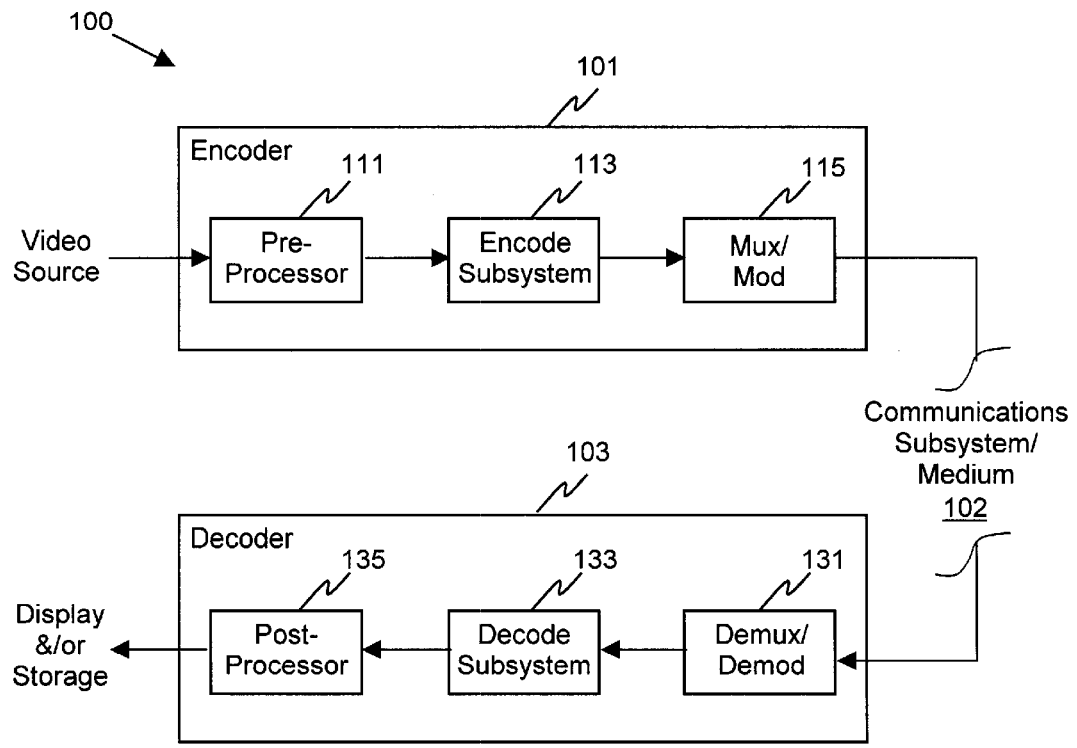
FIG. 1 is a flow diagram illustrating a conventional codec.
Figure 2A:
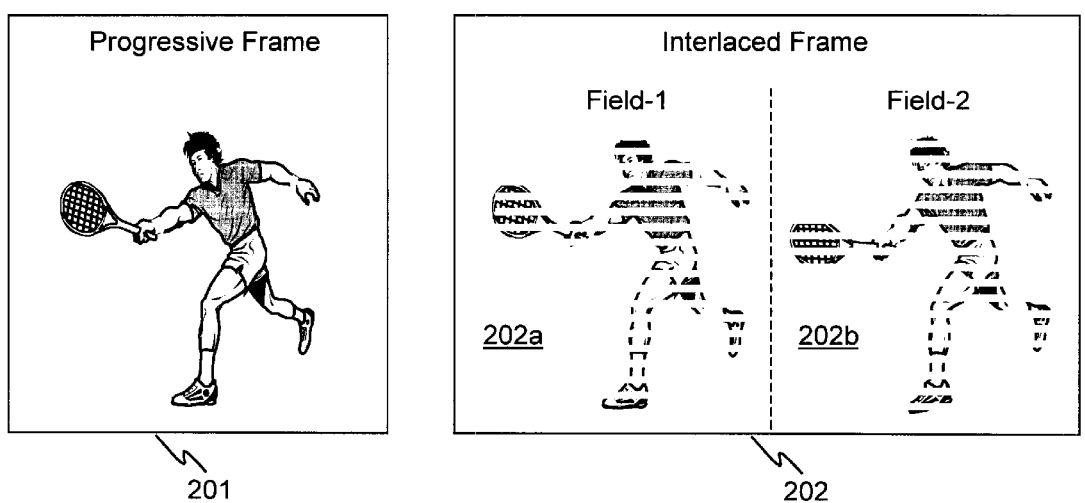
FIG. 2a illustrates conventionally utilized progressive and interlaced display frames.
Figure 2B:
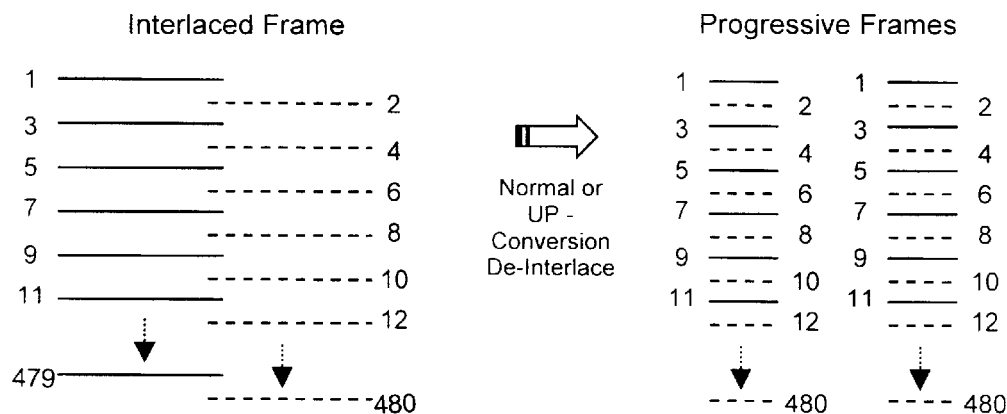
FIG. 2b illustrates an up-conversion de-interlacing problem encountered due to the incompatibility between an output interlaced signal and a progressive display.
Figure 2C:
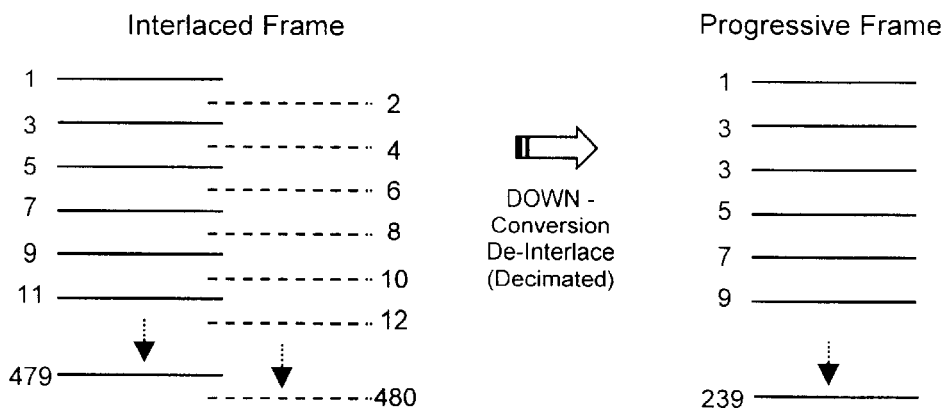
FIG. 2c illustrates how a different down-conversion problem is encountered due to the incompatibility between an interlaced source video signal and a progressive-input encoder, as is addressed by the current invention.
Figure 4:
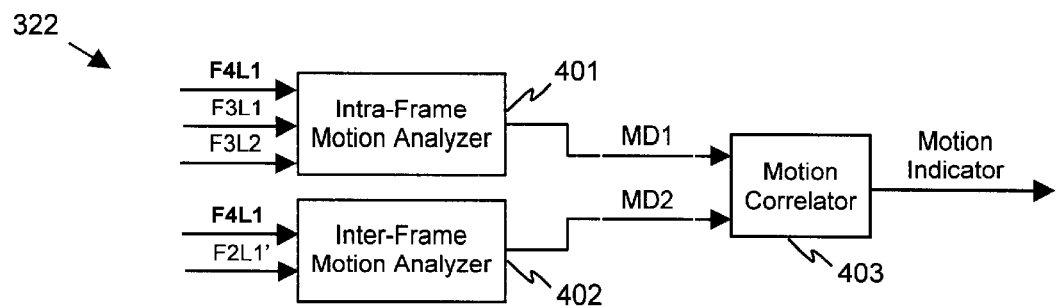
FIG. 4 is a flow diagram illustrating the motion analyzer of the FIG. 3c converter in greater detail.

Turning to FIGS. 4 through 7b with reference to FIG. 2, motion analyzer preferably performs more than one form of motion analysis, and more preferably performs current-pixel based intra-frame and inter-frame analysis (FIG. 4). The resulting motion determinations produced by intra-frame motion analyzer 401 and inter-frame motion analyzer 402 (MD1 and MD2 respectively) are then preferably resolved by motion correlator 403 to produce a single motion indicator.

One reason for such multiple motion determination is that combined intra-frame and inter-frame determination appear to better integrate not only the current conversion results, but also those of prior and subsequent conversion. Returning briefly to FIG. 2, between the capturing time of field-I and field-2, significant motion is evident. Just as importantly, however, such motion is observed to be subject to variability throughout the field images. For example, generally increasing motion is observed to occur extending outward from the tennis player's body along the right arm and tennis racket. Such variable motion likely originated in a prior frame and will likely continue into successive frames (e.g. depending on video length, editing, etc.). While more typically observed in generally high activity video, such as sporting events, variable and often intermittent image-portion motion is also observed in generally lower activity video as well.

It is believed that pixel-based processing and both intra and inter frame analysis, as utilized, facilitate a more natural optical flow both transitionally within a resulting de-interlaced frame (which might include a variable amount of field and/or frame data due to conversion), and in accordance with ongoing motion. As practiced in the preferred encoder IC, the two motion analyses appear to provide a compromise yielding consistently higher-quality results. While performing optical flow analysis might yield yet further quality benefits, the associated resource overhead was considered inefficient given the higher-quality results already achieved. Another reason for performing more than one form of motion analysis is to provide greater confidence in the results of the intra-frame analysis, as will be discussed in greater detail.

Figure 5:
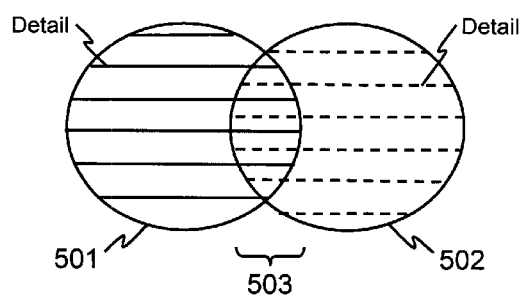
FIG. 5 illustrates an overlap of fields in an interlaced frame.

Intra-frame motion analysis according to the invention is illustrated in FIGS. 5 through 6c. Beginning with FIG. 5, in addition to the difficulties presented by interlaced data thus far, offsetting of the two field images clouds image attributes. For example, while a human observer might readily recognize objects 501 and 502 as being separate depictions having several distinguishable attributes, a processing system "sees" the underlying data as merged within overlapping region 503. Separating the two images is generally considered to require considerable processing (e.g. edge detection, object tracing, re-alignment, etc.). However, it is found that, actual separation of the two images is not required for further processing. Rather, despite merging of vertical detail and motion effects within region 503, substantially less extensive processing can be used to produce an approximated motion determination.

Continuing with FIG. 6a, an intra-frame motion determination method according to the invention broadly comprises receiving interlaced field data corresponding to an image-portion (step 511) forming an image-portion interpolation from the received data (step 513), and combining the received and interpolated image-portions to remove vertical detail (step 515). As will become more apparent, the extent of motion can be ascertained from the combination. Using subtractive combination for example, a small difference would indicate a high likelihood of no motion, while a very large difference (assuming reasonably low noise) would indicate substantial motion, as will be discussed in greater detail. While the determination provides only a rough approximation of motion (and conversely, detail), motion processing in accordance with the results are nevertheless found to be consistently reliable. Greater confidence in the approximation, which provides generally accurate determinations, can also be provided by using additional motion determination techniques (e.g. inter-frame motion determination).

In the preferred encoder IC (FIGS. 6b and 6c), intra-frame motion determination is implemented using averager 611 and process 612. More specifically, in addition to current-pixel data from F4L1, averager 611 also receives positionally-corresponding pixel data from the adjacent scan lines of the remaining field (F3L1 and F3L2). Averager then forms an interpolation of the current-pixel by averaging the corresponding pixel data, and the average is subtracted from the current-pixel by process 612. While more extensive interpolation (e.g. using multiple frames) might improve the accuracy to some extent, additional processing is again found to be economically inefficient for the current preferred implementation.

Figure 7A:
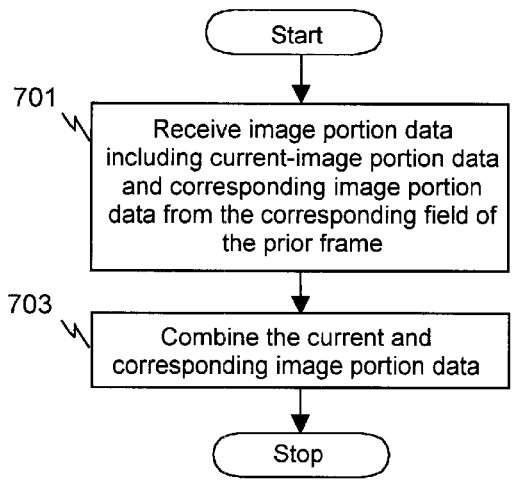
FIG. 7a is a flowchart illustrating an inter-frame motion determination method according to the invention.
Figure 7B:
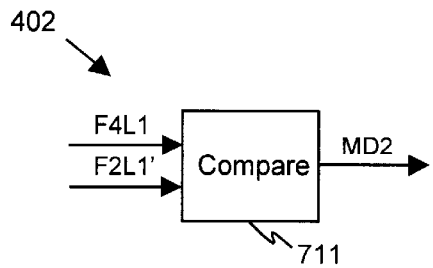
FIG. 7b is a flow diagram illustrating an inter-frame motion analyzer according to the invention.
Figure 7C:
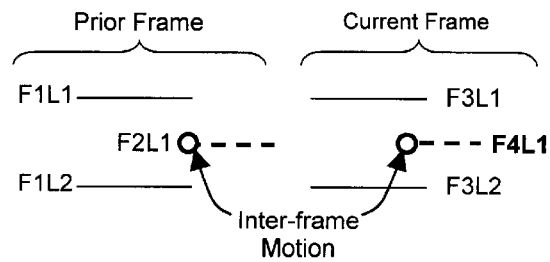
FIG. 7c illustrates pixel-based inter-frame motion determination as accomplished by the inter-frame motion analyzer of FIG. 7b.

Inter-frame motion determination according to the invention is illustrated in FIGS. 7a through 7c. As depicted in the FIG. 7a flowchart, inter-frame motion determination is broadly accomplished by receiving image-portion data including current image-portion data and prior corresponding image-portion data from the corresponding field of the prior frame (step 701) and comparing the image the corresponding-image data to form a motion determination (step 703). The preferred use of only actual data is found to provide a more accurate motion indication that appears to further facilitate more natural overall optical flow as successive frames are converted. In the preferred encoder IC implementation (FIGS. 7b and 7c), the current-pixel (in F4L1) is subtracted from the corresponding pixel of the same field of the immediately prior frame (i.e. in F2L1), which preferably has been vertically filtered, as discussed above. While again considered undesirably resource-intensive with the current preferred encoder IC, other image-portions and more extensive processing (e.g. multiple field/frame data, optical flow analysis, etc.) can be used in greater-resource systems to provide greater accuracy.

Figure 8A:
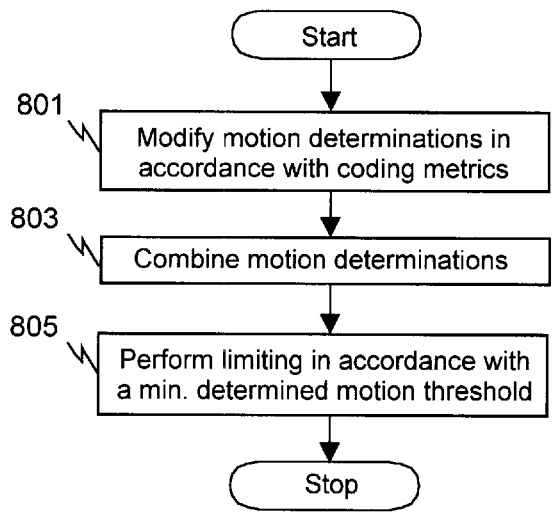
FIG. 8a is a flowchart illustrating a motion determination correlation method according to the invention.
Figure 8B:
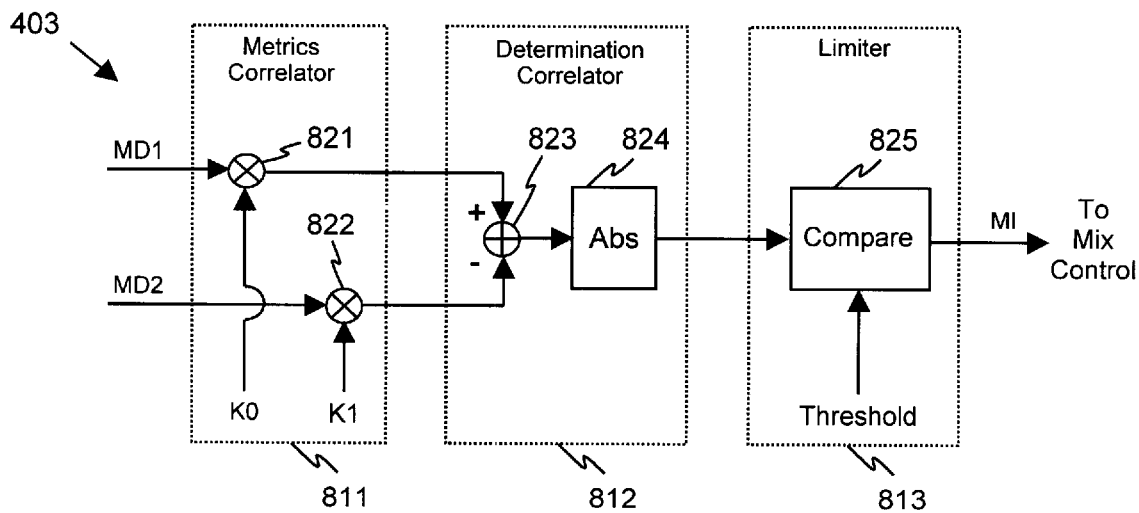
FIG. 8b is a flow diagram illustrating the correlator of FIG. 4 in greater detail.

Turning to FIGS. 8a and 8b, further motion determination processing is preferably utilized to provide a control signal for subsequent combination. First, correlation is performed on the motion determinations to produce a motion indicator. As shown in FIG. 8a, correlation according to the invention broadly includes modifying the motion determinations in accordance with activity metrics (step 801), correlating the modified determinations (step 803), and performing limiting (step 805).

In conventional encoding, coding metrics are typically ascertained prior to actual coding in order to facilitate the operation of the encode-subsystem after pre-processing. A variety of such coding metrics are formed (e.g. entropy, noise, frequency content, etc.) on a frame basis so that the encode-subsystem will "know enough about each frame," at least statistically, to allocate bitrate, adjust noise, form predictions and otherwise code each frame. In accordance with the invention, coding metrics can also be utilized during pre-processing (in addition to and/or as substituted for experimentally derived metrics). More specifically, the use of derived and/or coding metrics and limiting is found to facilitate more accurate motion determination in the context of performing adaptive conversion as taught herein.

In the preferred encoder IC implementation, correlation is provided as illustrated in FIG. 8b. As shown, within metrics correlator 811, the intra-frame motion determination (MD1) and inter-frame determination (MD2) are multiplied respectively (processes 821 and 822) by scaling factors K0 and K1 to form modified motion determinations. Determination correlator 812 then subtractively combines the modified motion determinations (process 823) and an absolute value 824 is applied to assure a more efficient positive resulting motion determination (e.g. removing the need for a sign indicator and simplifying processing). Finally limiter 813 compares the resulting motion determination with a motion threshold parameter; motion is assumed not to exist unless both motion determinations indicate motion of the current-image-portion. That is, motion is considered to exist where the threshold value is exceeded according to the following equation-1:

$$|(K0)(MD1)-(K1)(MD2)|>\text{Threshold} \qquad \text{[Equation-1]}$$

K0, K1 and threshold are programmable eight bit parameters that can be used to refine down-conversion de-interlacing results. The values are currently set according to the experimentally derived typical motion characteristics of a current video source types. As an example, for typically high motion sporting events, K0 and threshold are set low (e.g. from about 0 to 64 and about 65 respectively), and K1 is set high (e.g. about 200 to 255). For movies, which exhibit moderate to high motion, K0 is typically set to a moderate to high value greater than moderate K1 and threshold values (e.g. 128 to 255, 0 to 128 and 128 respectively). However, the values can be set and/or recalled in a variety of ways (e.g. static, dynamic, manual, automatic, etc.) utilizing a wide variety of metrics (e.g. electronic guide downloads, telecine-machine repeated field detection, coding metrics, etc.)

Figure 9A:
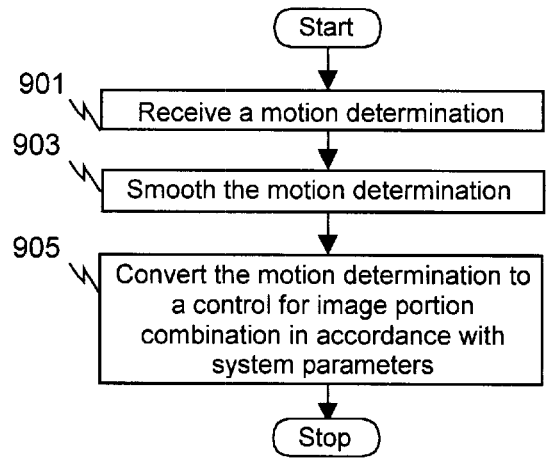
FIG. 9a is a flowchart illustrating a method for converting a motion determination into an image combination control according to the invention.
Figure 9B:
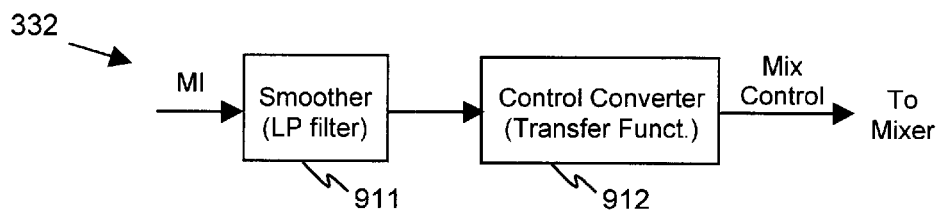
FIG. 9b is a flow diagram illustrating the adaptive control of FIG. 3c in greater detail.

During a final adaptive control step of motion processing, correlated motion determination information or motion indicator ("MI") is modified, according to system parameters, for controlling how image-portion data will be combined. As is broadly illustrated in FIG. 9a, the motion indicator is received (step 901), smoothed (step 903) and then converted to a control for image-portion combination in accordance with system parameters (step 905). More specifically, in accordance with the preferred encoder IC implementation (FIG. 9b), smoother 911 comprises a low pass filter for spreading the motion data over several samples and thereby avoiding noise susceptibility. Control converter 912 further applies a transfer function that is preferably received as a programmable system parameter.

The use of a transfer function enables the (smoothed) motion indicator, which is in the form of processed image information, to be converted to a control parameter indicative of the amounts of image-portion field and frame data that should be included in de-interlaced output in accordance with the determined motion. More specifically, given so much motion, how much current-pixel data and current-plus-corresponding pixel data should be mixed together? (In a more extensive implementation, directional motion and/or other attributes might also be processed.) The transfer function itself is otherwise implemented in a conventional manner.

Figure 9C:
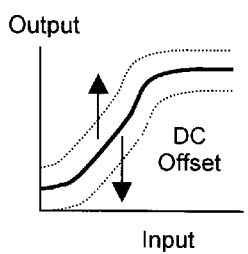
FIG. 9c is a graph illustrating a variable dc offset property of a transfer function used by the adaptive control of FIG. 9b.
Figure 9D:
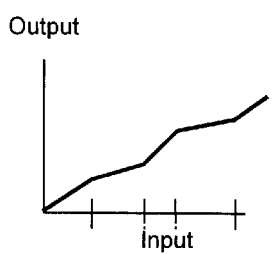
FIG. 9d is a graph illustrating piecewise linear and monotonically increasing properties of a transfer function used by the adaptive control of FIG. 9b.
Figure 9E:
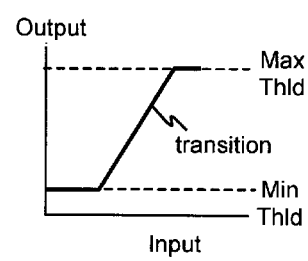
FIG. 9e is a graph illustrating a clipping control property of a transfer function used by the adaptive control of FIG. 9b.

The specific transfer function (or other conversion) utilized will depend on various system considerations, such as motion determination methods utilized and resulting data, mix control input format and the precision with which motion is to be reflected in the output mix (and/or yet other processing that might be utilized). A high degree of subjectivity exists with regard to "image quality." However, observations thus far suggest using a linear transfer function that provides for variable dc offset (FIG. 9c), is piecewise linear (about 20 to 48 steps) and monotonically increasing (FIG. 9d), and that provides for clipping control (FIG. 9e). Non-linear transfer functions can also be used, where applicable.

Figure 9F:
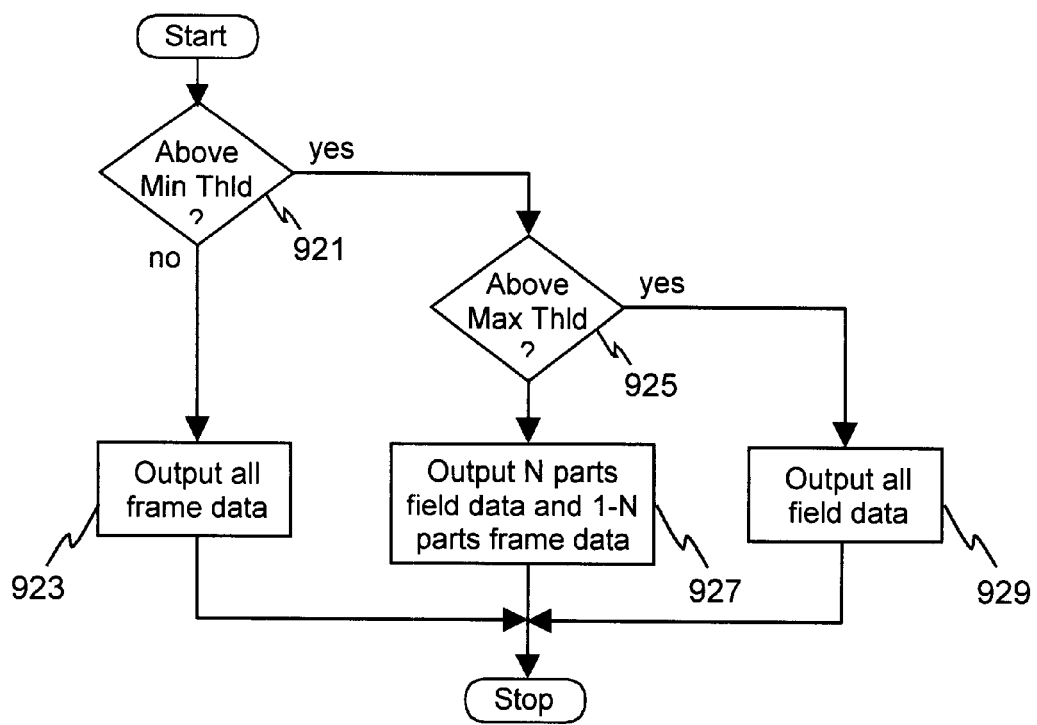
FIG. 9f is a flowchart illustrating a method for combining frame and field representations of an image-portion according to the invention.

In the preferred encoder IC, a transfer function generally consistent with the method of FIG. 9f is utilized. That is, if the motion is below a minimum-motion threshold (step 921), then all processed frame data is output as with averaging (step 923). If the motion is above the minimum threshold but below a maximum threshold (step 925), then a mixture including N parts field data and 1–N parts of frame data is output (step 927). Otherwise, if the motion is above the maximum threshold, then all field data is output as with decimation. (The value, N, which is between zero and one, is actually transferred.)

Figure 10A:
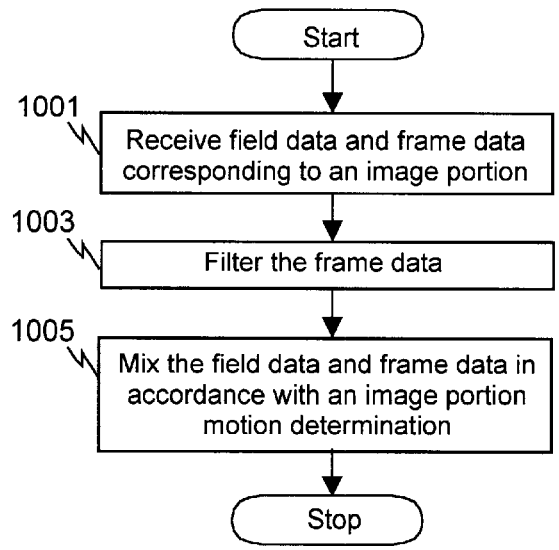
FIG. 10a is a flowchart illustrating a video processing method for converting an interlaced video source into a de-interlaced output according to the invention.

Turning to FIG. 10a, video processing according to the invention broadly comprises receiving field data and frame data corresponding to an image-portion (step 1001), filtering the frame data (step 1003) and mixing the field and frame data in accordance with an image-portion motion determination (1005).

Figure 10B:
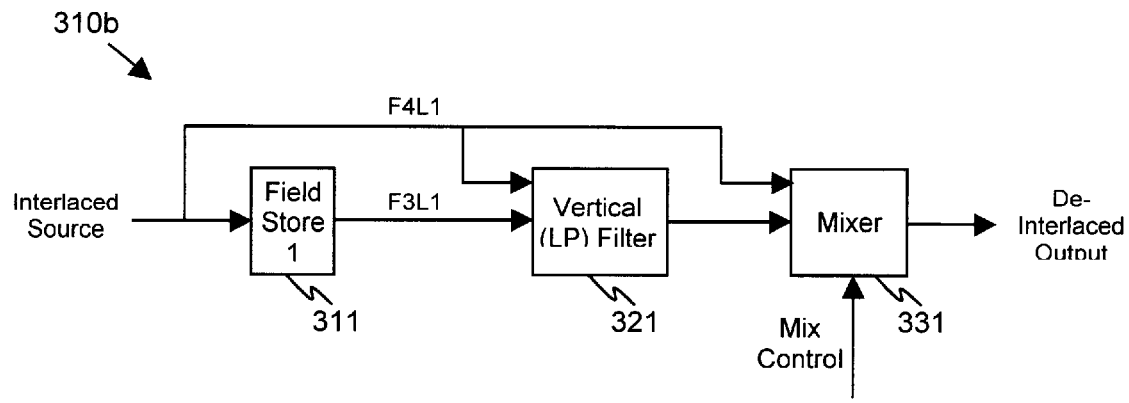
FIG. 10b is a flow diagram illustrating a video processing portion of the converter of FIG. 3c.

Continuing with FIG. 10b, during video processing conducted by the preferred encoder IC, current-pixel data (i.e. in F4L1) is received directly by vertical filter 321 and mixer 331. Corresponding-pixel data from the same scan line of the remaining field (i.e. in F3L1) is similarly received by the filter and mixer, but via field store-I 331, as discussed. In accordance with this configuration, un-processed current-pixel data is mixed with filtered current-pixel plus corresponding pixel data, the amount of each being determined in accordance with a mix control parameter from adaptive control 332 (FIG. 3c).

Figure 10C:
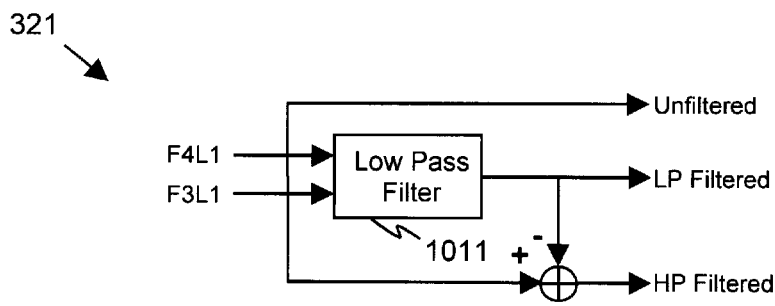
FIG. 10c is a flow diagram illustrating the vertical filter of FIG. 10b in greater detail.

Vertical filter 321 is preferably implemented as a low-pass filter according to the configuration of FIG. 10c. While more extensive processing might be conducted, a conventional 3-tap low pass filter is found to produce high-quality conversion results consistent with the above-mentioned tradeoffs of the implementation. For similar reasons, the low-pass filter configuration of FIG. 10c, is more preferably utilized, as it efficiently provides sufficient quality unfiltered, low-pass filtered and high-pass filtered coefficients with only the addition of a subtractive process.

Mixed (i.e. down-conversion de-interlaced) output can, in accordance with the method of FIG. 9f, include only filtered frame data (i.e. vertically filtered current plus corresponding-pixel data), only field data (i.e. current-pixel data) or a mixture of field data and frame data. More specifically, it is observed that outputting only filtered frame data where low or no motion is determined provides maximum of video information without super-Nyquist artifacts and with little or no noticeable blurring. Outputting only field data where high-motion is determined further provides sufficient information while avoiding blurring effects otherwise caused by necessary filtering. Finally, outputting a mixture of filtered frame data and increasing relative amounts of field data in accordance with increasing motion provides not only a perceivably optimal mix of maximized detail with minimized blurring, but also provides a desirably smooth transition, particularly at sub-image granularities, such as pixels.

While the present invention has been described herein with reference to particular embodiments thereof, a degree of latitude of modification, various changes and substitutions are intended in the foregoing disclosure, and it will be appreciated that in some instances some features of the invention will be employed without corresponding use of other features without departing from the spirit and scope of the invention as set forth.

I claim:

1. A method for determining intra-frame motion, comprising:

receiving interlaced video data including a current image-portion within a current-field of a current-frame of said interlaced video data;

forming an interpolation of said image-portion in accordance with data within a remaining field of said current-frame; and comparing said image-portion with said interpolation.

2. An intra-frame motion analyzer comprising:

means for receiving interlaced video data including a current image-portion within a current-field of a current-frame of said interlaced video data;

means for forming an interpolation of said image-portion in accordance with data within a remaining field of said current-frame; and means for comparing said image-portion with said interpolation.

3. A method for determining inter-frame motion, comprising:

receiving interlaced video data including a current image-portion within a current-field of a current-frame of said interlaced video data; and comparing said current image-portion with received video data including a corresponding image-portion of an immediately prior frame.

4. A method according to claim 3, wherein said image-portion is a current-pixel within a current scan-line, and said corresponding image-portion is a corresponding pixel in a corresponding field of said immediately prior frame.

5. An inter-frame motion analyzer, comprising:

means for receiving interlaced video data including a current image-portion within a current-field of a current-frame of said interlaced video data; and means for comparing said current image-portion with received video data including a corresponding image-portion of an immediately prior frame.

* * * * *